United States Patent [19]

Wallace et al.

[11] 4,413,396
[45] Nov. 8, 1983

[54] MICROPROCESSOR CONTROL YIELD POINT TIGHTENING SYSTEM

[75] Inventors: William K. Wallace, Barneveld; David A. Giardino, New York; Joseph R. Groshans, Deerfield, all of N.Y.

[73] Assignee: Chicago Pneumatic Tool Company, New York, N.Y.

[21] Appl. No.: 183,424

[22] Filed: Sep. 2, 1980

[51] Int. Cl.³ .......................... B23P 19/06; G01L 5/24
[52] U.S. Cl. .......................................... 29/407; 173/1
[58] Field of Search .................... 29/240, 407; 73/761, 73/862.24; 173/1, 12; 364/505, 508

[56] References Cited

U.S. PATENT DOCUMENTS

| 2,600,549 | 6/1952 | Ledbetter | 81/52.4 |
|---|---|---|---|
| 3,827,506 | 8/1974 | Himmelstein et al. | 173/12 |
| 3,962,910 | 6/1976 | Spyridakis et al. | 73/761 |
| 4,000,782 | 1/1977 | Finkelston | 173/12 |
| 4,091,451 | 5/1978 | Weiner et al. | 173/12 X |
| 4,104,779 | 8/1978 | Sigmund | 29/407 |
| 4,142,591 | 3/1979 | Himmelstein | 173/12 |
| 4,147,219 | 4/1979 | Wallace | 173/12 |
| 4,179,786 | 12/1979 | Eshghy | 29/407 |

Primary Examiner—Ervin M. Combs
Attorney, Agent, or Firm—Stephen J. Rudy

[57] ABSTRACT

A method for tightening a fastener to yield point wherein areas under a torque-angle curve—each of said areas including a constant abscissa—are successively measured. A decrease of area in a subsequently measured area, indicates that yield point of the fastener has occurred. Upon attainment of yield point, the final torque and angular rotation parameters are checked to determine if pre-set values have been realized. The method includes a preliminary torque-angle curve measurement to determine if certain conditions are satisfied; failure to satisfy such conditions, aborts the tightening operation.

2 Claims, 6 Drawing Figures

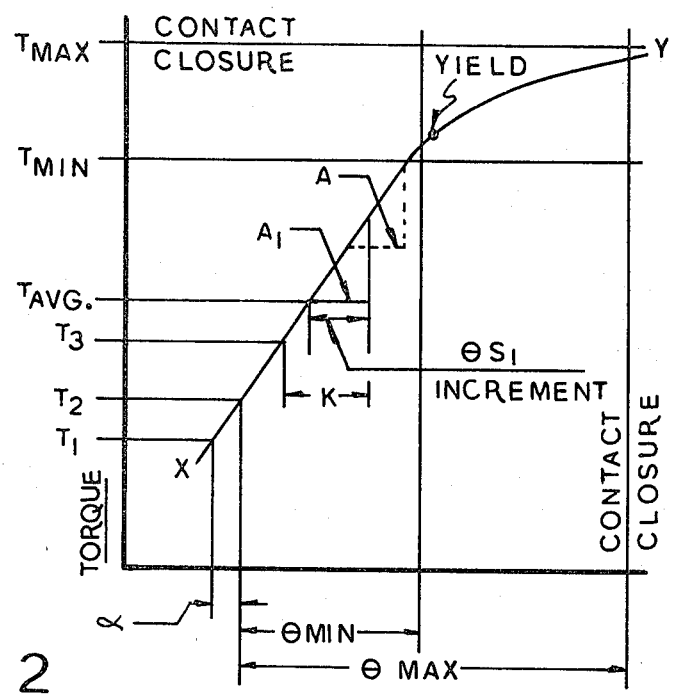
FIG. 1
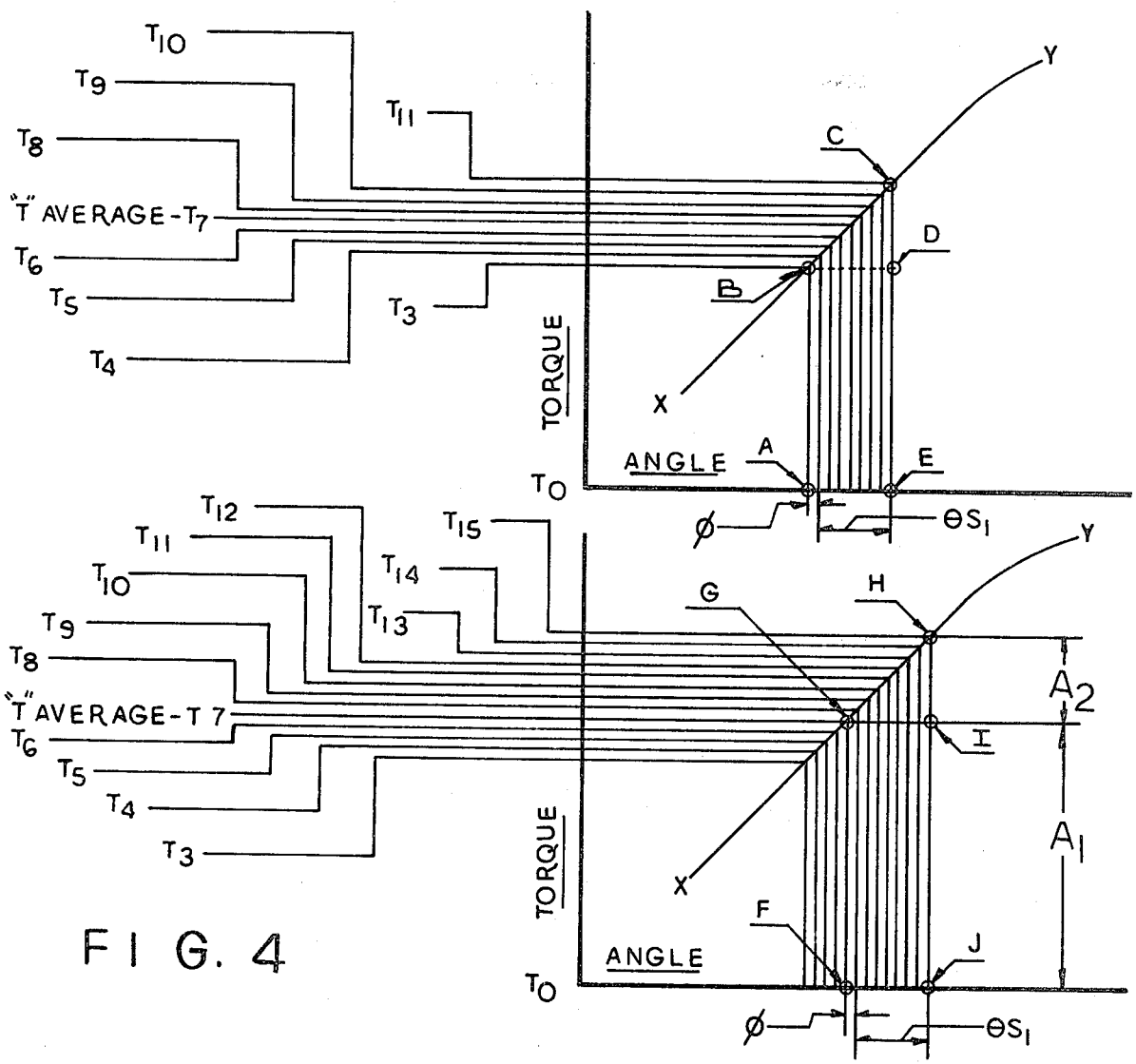
FIG. 2
FIG. 4

FIG. 3

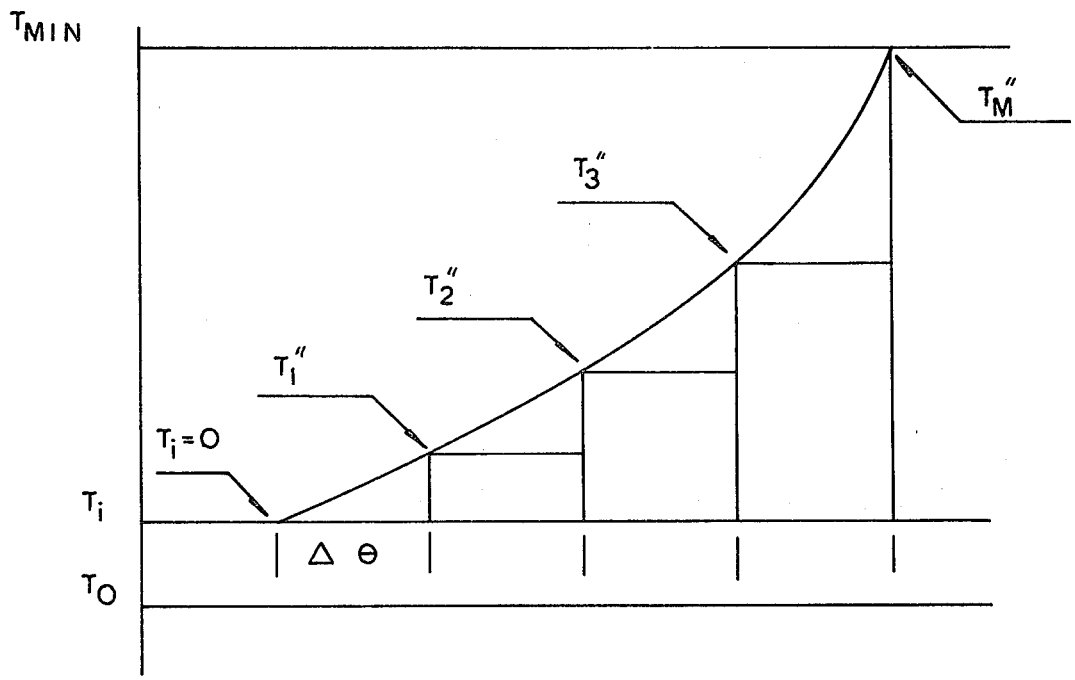

FORMULA FOR AREA UNDER ACTUAL TORQUE TURN CURVE FROM $T_i$ TO $T_{MIN}$ $$A = \left[\tfrac{1}{2}\Delta\theta T_1''\right] + \left[T_1''\Delta\theta + \tfrac{1}{2}\Delta\theta(T_2''-T_1'')\right] + \left[T_2''\Delta\theta + \tfrac{1}{2}\Delta\theta(T_3''-T_2'')\right] + \left[T_3''\Delta\theta + \tfrac{1}{2}\Delta\theta(T_M''-T_3'')\right]$$

$$A = \Delta\theta\left[\tfrac{1}{2}T_1'' + T_1'' + \tfrac{1}{2}T_2'' - \tfrac{1}{2}T_1'' + T_2'' + \tfrac{1}{2}T_3'' - \tfrac{1}{2}T_2'' + T_3'' + \tfrac{1}{2}T_M'' - \tfrac{1}{2}T_3''\right]$$

$$A = \Delta\theta\left[T_1'' + T_2'' + T_3'' \ldots\ldots + \tfrac{1}{2}T_M''\right]$$

NOTE: FOR THE ABOVE FORMULA $T_i$ THRU $T_M$ ARE MEASURED FROM $T_i$ AND NOT $T_0$

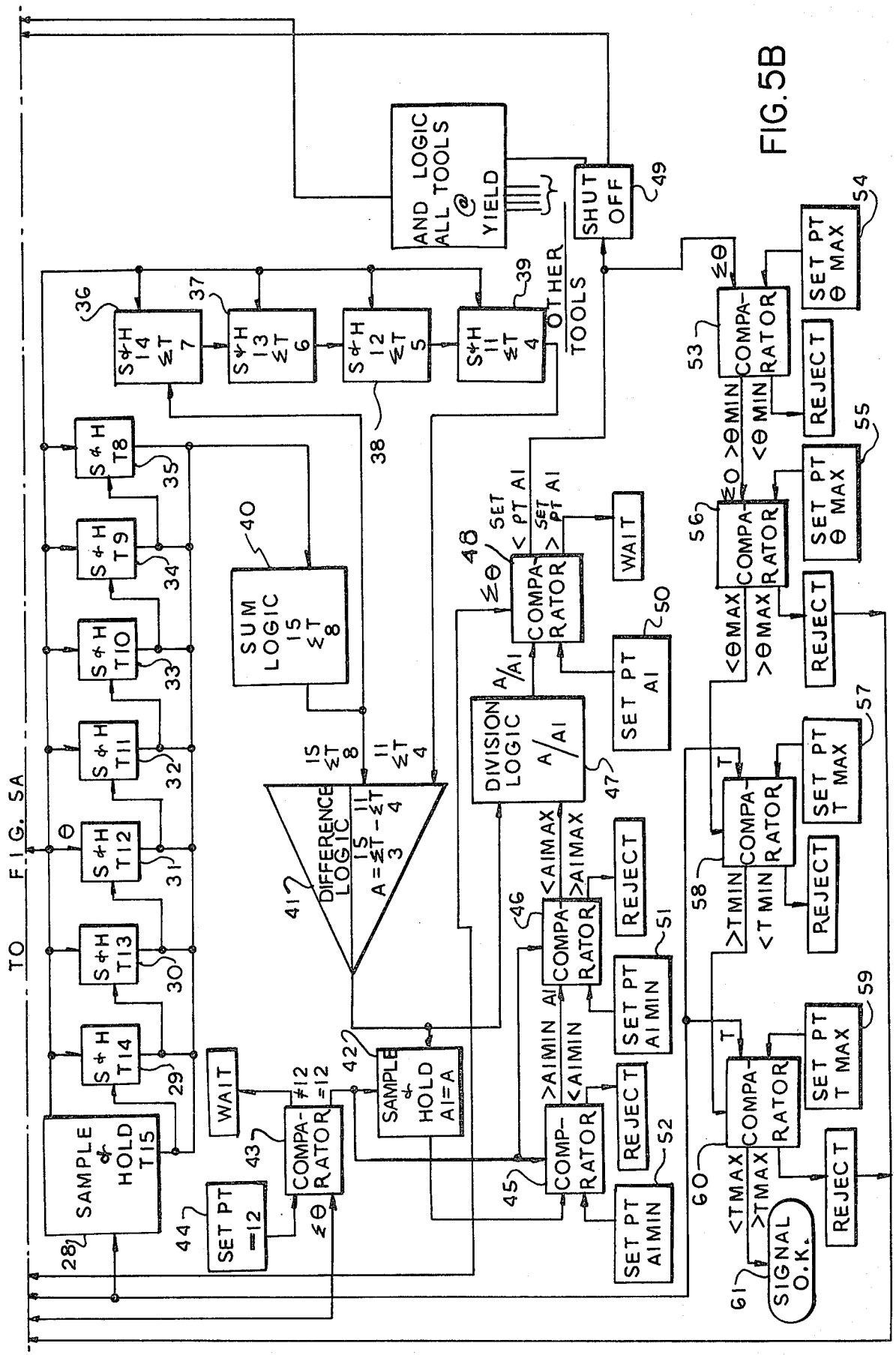

MICROPROCESSOR CONTROL YIELD POINT TIGHTENING SYSTEM

BACKGROUND OF THE INVENTION

This invention relates to a method for simultaneously tightening threaded fasteners to yield point, or to a point wherein predetermined deformation of each fastener assembly occurs. Torque load is maintained until all fasteners are stressed to a predetermined point, at which time the power to all fastener setting tools is terminated.

While many different methods have been proposed and utilized for attainment of desired final torquing in fastener run-up and setting operations, the method of the present invention employs comparative change in areas under a curve developed by torque and angular rotation parameters. In such manner, errors associated with instantaneous reading, or arithmetical averages, of a torque angular rotation curve, are minimized. Consequently, final fastener yield point sensing is more accurately realized; power shut-off is initiated only after predetermined tension values are realized. In addition to tension control regulation, the invention incorporates certain "fail safe" features which guard against, (1) cross threaded fasteners, (2) galled fasteners, (3) broken fasteners, (4) no fasteners, and (5) low, or unacceptable, strength of an assembly.

GENERAL DESCRIPTION OF THE METHOD

The method includes five steps in a tightening cycle, which steps are:

1. Initial Rate Analysis—monitors the initial portion of the tightening cycle, makes a comparison with a predetermined limit, and either continues, or aborts the cycle. 2. Interlock and Ramp—each tightening tool, in a multiple nutrunner set-up, will be torqued to a predetermined level and will remain in such level until all tools are torqued to the predetermined level following which the torque level is increased at a controlled rate until yield point of each fastener is reached.

3. Yield Sensing—is accomplished by measuring the rate of increase in energy, or work, as each fastener is tightened. A decrease in such rate indicates that yield point has been reached.

4. Tool Shut Down—when yield point has been detected, a valve operates to stop pressure increase to each fastener setting tool, while maintaining a holding pressure. Should fastener load decrease, rotation would resume to restore the fastener to original load value to maintain yield point.

5. Final Check Cycle —after all fastener assemblies have been tightened to yield point, the method checks final values of torque and angular displacement of each fastener assembly, to assure that all are within pre-set limits.

BRIEF DESCRIPTION OF THE DRAWINGS

FIG. 1 is a chart showing a torque-angle curve indicating certain parameters involved in practice of the method of the invention;

FIG. 2 is similar to FIG. 1, but illustrating other parameters involved;

FIG. 3 illustrates a torque-angle curve with a formula for compilation of areas under said curve;

FIG. 4 is similar to the curve of FIG. 2, but illustrating other variables considered in practice of the method of the invention; and FIGS. 5A and 5B are schematic drawings showing the electronic circuitry and component parts for practice of the method of the invention.

DESCRIPTION OF THE INVENTION

Figure 5A:
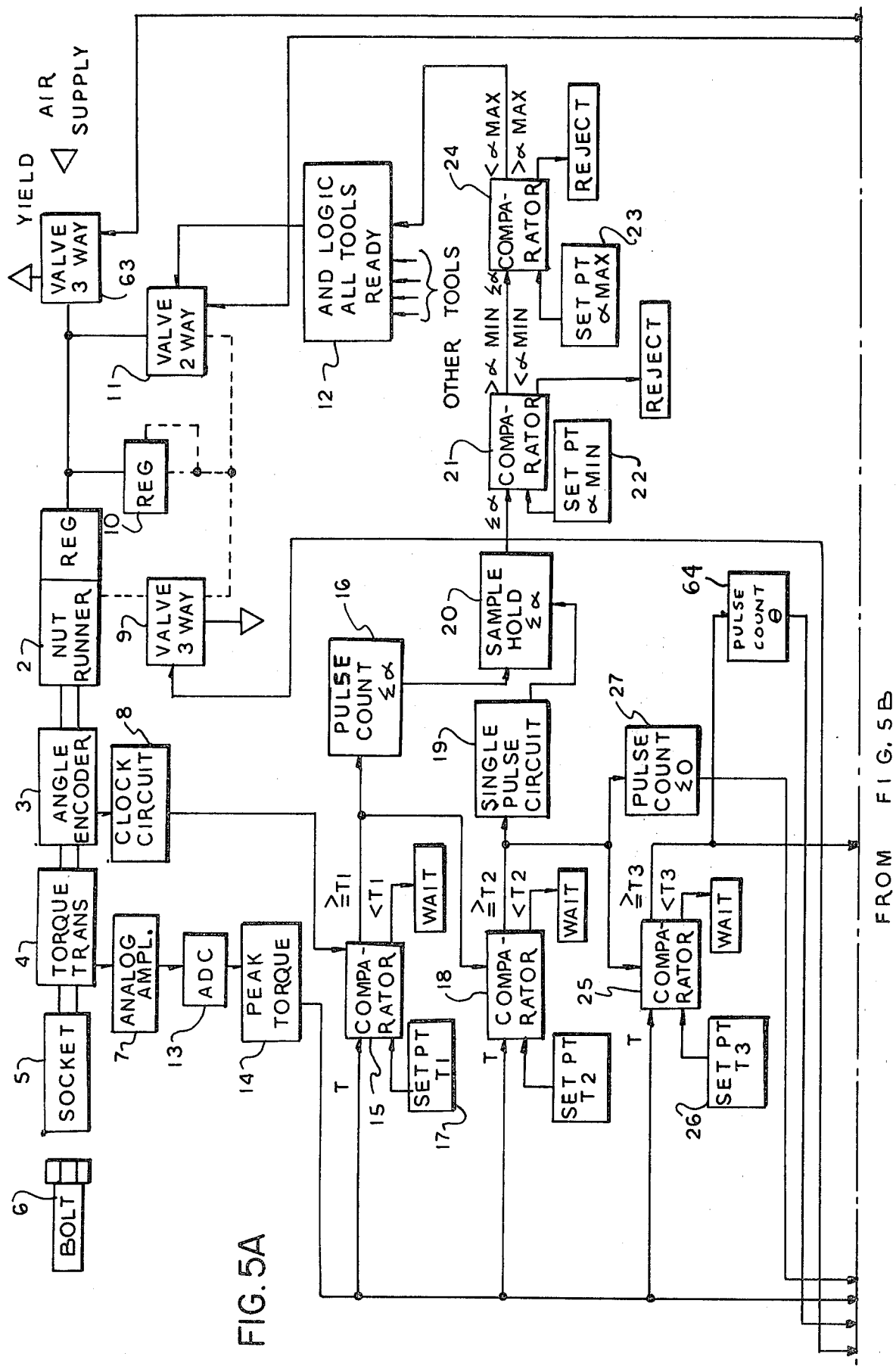

With reference to FIG. 1, at the start of the cycle (Step 1) low air pressure supplied to a given tool raises the torque level to ($T_1$). A predetermined set point is used for each specific fastener setting operation. Once the torque level ($T_1$) is exceeded, measurement of angular displacement begins, and is measured until torque level ($T_2$) is attained, a second predetermined set point. The measured angle ($\alpha C$) of rotation between ($T_1$) and ($T_2$) i.e., the abscissa of the torque-angle triangle, is compared to pre-set min. and max angles of rotation, and if within such limits, the cycle continues, and if not the cycle is rejected. Such initial rate inspection is used to detect a crossed, a defective thread, or a misassembled part.

A feature of the disclosed method is the possibility of controlling rate of torque increase with respect to time, by use of nutrunners of the type disclosed in the U.S. Pat. No. 4,147,219, issued Apr. 3, 1979, to William K. Wallace, as well as his two previous patents mentioned therein. Such nutrunners do not "stall out", and air pressure can be gradually increased or "ramped", thus controlling a torque rate increase which is directly proportioned to tool air supply pressure. Accordingly, with air pressure held at a constant level, the output torque of the nutrunner will remain at such proportional torque level until air pressure is changed.

After passing the second torque point ($T_2$) the torque will reach a third torque point ($T_3$), which is another predetermined set point, initiating beginning of yield sensing portion of the cycle. As illustrated, in FIG. 1, the energy, or work level (area under curve X—Y) increases at a uniform rate up to the point of yield, after which the rate decreases.

Although the curve X—Y is shown as a straight line, in actuality, the locus of the points of the curve do not form a straight line. The use of instantaneous readings, or arithmetical averages of such points would introduce errors into the calculations. Since the method of the invention utilizes the area under the X—Y curve to detect rate of change, such errors are minimized.

With reference to FIG. 2, the technique of using torque-angle measurements to sense yield, will now be described.

After level $T_3$ is exceeded the torque value at each unit of angular displacement ($\phi$) is measured over a predetermined angle $\theta_{sl}$.

For illustrative purposes assume value of 1° for the unit of angular displacement $\phi$ and 8° as the value of $\theta_{sl}$.

As can be seen the area under curve X—Y for the angular distance $\theta_{sl}$ can be represented by the area of the polygon ABCE, and also by the sum of the areas of ABDE and BCD.

The average torque under the portion of the curve BC is equal to $$T \text{ average} = \frac{\Sigma(T_4 \text{ thru } T_{11})}{\theta_{sl}}$$

To illustrate that the area under the curve is equal to the sum of the included torques, please refer to FIG. 3. Although the formula $A = \Delta\theta[T_1'' + T_2'' + T_3'' \ldots + \frac{1}{2}T'm]$ includes in the summation portion ... $+\frac{1}{2}T'm$, the calculation the system uses does not take $\frac{1}{2}$ of Tm, but uses the whole value "Tm" for reasons of simplicity, since the error introduced would be negligible, because the values are compared by a ratio.

As the angle portion $\theta_{sl}$ advances through the tightening excursion the area under the curve XY will increase at a uniform rate during the straight line portion of the curve XY. Beyond the straight line portion the increase will be at a lower rate. It is this change in rate that this system uses to sense the yield.

The area of energy above the base (To) for the angular distance $\theta_{sl}$, is the sum of the combined areas of the rectangle ABDE and triangle BCD.

For each unit of angular advancement $\phi$ during the straight line portion of curve XY, the area of the triangle BCD will be equal to its predecessor.

The value of any triangle calculated in this straight line portion of the curve, can be used as a reference to determine yield. When the area of subsequential triangles decrease, this indicates that less energy was required to obtain additional rotation which by known stress theory indicates yield. While a straight line from B to C is used to illustrate the method of the invention, it should be apparent the the curve from B to C could be of any shape, as long as a constant abscissa is employed in each area measurement. In other words, $\theta$ should be the same value in each area measurement.

Referring now to FIG. 4, if $\theta_{sl}$ is advanced 4 units of displacement $\phi$, or $\frac{1}{2} \theta_{sl}$ (per illustration of $\theta_{sl}=8$), along the curve XY, the area under this portion of the curve XY is expressed by the area of polygen FGHJ. The area can also be expressed by the sum of the combined areas of FGIJ and GHI. Please note that the base line G—I of triangle GHI corresponds with the level of "T" average of the previous calculation.

The area of triangle GHI is used as the reference to determine yield.

The analytic method of deriving this area will be presented.

For the present position of $\theta_{sl}$ the area of "$A_1$" can be expressed as $A_1 = $ "T" average $\times \theta_{sl}$ Substituting $\dfrac{\Sigma T_4 \text{ thru } T_{11}}{\theta_{sl}}$ for "T" average $A_1 = \dfrac{\Sigma T_4 \text{ thru } T_{11}}{\theta_{sl}} \times \theta_{sl}$ $A_1 = \Sigma T_4 \text{ thru } T_{11}$ Applying the formula from FIG. 3 to FIG. 4, the area FGHJ is the sum of torque values 8 thru 15 or $\Sigma T_8 — T_{15}$. The area of triangle $A_2$ can be calculated by:

$A_2 = [\Sigma T_8 - T_{15}] - A_1$
substituting $\Sigma T_4 - T_{11}$ for $A_1 =$
$A_2 = [\Sigma T_8 - T_{15}] - [\Sigma T_4 - T_{11}]$ This first calculation of triangle $A_2$ is stored and becomes the reference $A_2'$ to determine yield. As the cycle continues, for each displacement unit $\phi$, $A_2$ is recalculated and compared to the stored reference.

The comparison is made by the quotient $A_2/A_2'$. The quotient remaining at unity would indicate no change in the energy rate. A quotient above unity would indicate an increase in the rate. A quotient less than unity would indicate a decrease in the energy rate.

As stated earlier, a decrease in the energy rate would indicate yield. Therefore, $A_2$ is calculated for each displacement portion and compared to $A_2'$ until the quotient of $A_2/A_2' \leq$ a predetermined value. At this point step four, takes place, as follows:

When $A_2/A_2' \leq$ set point, the solenoid valve controlling the torque ramp cycle closes, thus terminating fastener rotation.

To insure joint reliability, a final rate inspection (Step 5) occurs between the tool shut down and cycle completion. For an acceptable joint cycle to occur, the yield would have to fall within a "window" of predetermined set points of torque [Tmin. and Tmax.] and angular displacement [$\theta$ min. and $\theta$ max]. If the yield occurred outside these boundries the cycle would be rejected, because such would indicate a galled, or broken fastener.

DESCRIPTION OF SYSTEM OPERATION

Referring now to FIGS. 5A and 5B, air enters a recovery type nutrunner (2), such as disclosed in U.S. Pat. No 4,147,219. A pressure regulator (10) sets a rundown pressure on a pilot controlled regulator (1). This rundown pressure has a value which causes the fastener to be tightened to a predetermined torque level ($T_2$). The nutrunner(s) hold the torque at this value until the controls permit them to proceed.

An angle encoder (3) drives a clock circuit (8) which gives one clock pulse per degree of fastener rotation, or whatever degree setting is desirable, depending on the work conditions. A torque transducer (4) gives an analog voltage signal that is proportional to the torque being applied to the fastener. This value is converted to a digital signal by an analog to digital converter (13). A peak torque element (14) holds the highest torque value that passes thru it per clock pulse. This torque value is fed to a comparator (15) where it is held until the torque value exceeds the set point $T_1$ (17).

When ($T_1$) is exceeded, pulse count circuit (16) is actuated which begins to measure the angular displacement.

Peak torque values are fed to comparator (18) until torque ($T_2$) is exceeded. After ($T_2$) is exceeded, single pulse circuit (19) stores the $\alpha$ count in S+H (20). Total count proceeds to comparators (21) and (24) for $\alpha$ min. and $\alpha$ max. check. If $\alpha$ count value is between the two set point values signal is then sent to [and logic] (12). If $\alpha$ is not between the two set points the cycle is rejected.

When the tool(s) are all registered in (12) a signal actuates valve (11) causing the torque to "ramp" by gradually increasing the air pressure to the tool(s).

Comparator (25) allows clock pulses from (8) to pass to the [sample+hold] elements (28) thru (35), after the peak torque exceeds $T_3$.

Each clock pulse, after ($T_3$) was exceeded, clocks all the [sample & hold] units (28) thru (35). This action stores the most recent torque value in S+H (28) and moves the preceeding value that was in each of the S & H register to the next S & H register. Therefore, the eight most recent torque values will be stored in registers (28) thru (35). The eighth most recent value will be in register (35) and the most recent value will be in register (28). The eighth most recent torque value in register (35) will be dropped when the next clock pulse moves the value from register (34) into register (35) and a new value will enter register (28).

Each clock pulse, after (T₃) was exceeded, also clocks each of the [sample+hold] registers (36) thru (39). The sum logic (40) continuously totals the torque values in S+H registers (28) thru (35). Each successive pulse stores the most recent value in sum logic (40), in S+H register (36) and moves the preceeding value that was in each of the S+H registers (36) thru (39) to the next register. Therefore, the four most recent sums of the torque values in registers (28) thru (35) are stored in S+H registers (36) thru (39). The fourth most recent sum is in register (39) and the most recent sum is in register (36). The fourth most recent sum in register (39) will be dropped when the next clock pulse moves the value in register (38) to register (39) and a new value enters register (36).

Difference logic (41) continuously subtracts the value in S+H (39) from the value in the sum logic (40). Twelve pulses after (T₃) was exceeded, the sum of torque values 8 thru 15 (as shown by FIG. 4) is in sum logic (40) and the sum of the torque values 4 thru 11 is in S+H register (39). Therefore, at this clock pulse, the output of the difference logic (41) is the sum of the torque values 8 thru 15 less the sum of the torque values 4 thru 11. This value is the reference area "A". The output of pulse count (64) now equals 12, which is the value of set point (44), the clock pulse actuates S+H (42) storing the value of difference logic (41) at the 12th reading. This value is compared to set points (52) and (51) by comparators (45) and (46). If the value is between the set points, it proceeds to division logic (47) as "A₁". If it is not between the set points the cycle is rejected.

For each additional clock pulse a new value for "A" will be divided by "A"₁ to determine the yield. The quotient enters comparator (48) where it is compared to set point (50). The nutrunner continues tightening the fastener until the quotient A/A₁ is less than set point (50). When this occurs shut off element (49) closes valve (11) which stops the tool supply pressure from increasing and holds it at a constant level, causing rotation of the fastener to stop. Comparators (53) and (56) check the angular displacement $\theta$ to see if it is within acceptable limits. Comparators (58) and (60) do the same for the final torque values. If T max. or $\theta$ max. exceed their set points, three way value (9) stops the supply air to the tool tightening that fastener.

When all fasteners of an assembly reach yield, [and logic] (62) actuates valve (63) terminating cycle.

What is claimed is:

1. A method for tightening a fastener to yield point comprising the steps of:
   (1) rotating the fastener until a torque level T₃ is reached, which is the beginning of a yield point sensing operation;
   (2) recording said torque level T₃;
   (3) rotating the fastener through a predetermined angle $\theta_{sl}$ to arrive at torque level T₄;
   (4) recording said torque level T₄;
   (5) calculating the averaging torque between T₃ and T₄;
   (6) determining the area under the torque-angle curve by summing measured torque valves within the angular increment of $\theta_{sl}$ less the product of average torque times $\theta_{sl}$;
   (7) advancing predetermined angle $\theta_{sl}$ one angular increment and repeating the procedure set forth in steps 4, 5 and 6, and calculating a quotient based on a last determined area to that of an initially determined area; and
   (8) continuing the procedure set forth in step 7, until the ratio of the last determined area decreases from unity to a predesignated value at which point the tightening operation is terminated to avoid fastener torquing beyond yield point.

2. A method in accordance with claim 1, including rotating the fastener until a torque level T₁ is reached and recorded, and then rotating the fastener until a torque level T₂ is reached and recorded, then measuring the angle of rotation between torque level T₁ and T₂ and comparing said angle of rotation to a pre-set range of rotation angles, and if the measured angle is within said range continuing the tightening operation, and if said measured angle is not within said range, discontinuing the tightening operation.

* * * * *